United States Patent Office 2,744,905
Patented May 8, 1956

2,744,905
PROCESS FOR THE PRODUCTION OF THIOSEMI-CARBAZONES OF ISONICOTINALDEHYDE AND 4-PYRIDYL ALKYL KETONES

Werner Schäfer, Leverkusen-Schlebusch, Gerhard Domagk, Wuppertal-Elberfeld, Richard Wegler, Leverkusen-Schlebusch, and Engelbert Kühle, Bergisch Gladbach, Germany, assignors to Schenley Industries, Inc., New York, N. Y., a corporation of Delaware No Drawing. Application July 28, 1954,
Serial No. 446,402

Claims priority, application Germany August 17, 1953

7 Claims. (Cl. 260—294.8)

The present invention relates to a process for the production of thiosemicarbazones of isonicotinaldehyde (4-pyridine carboxaldehyde) and similar 4-carbonyl-substituted pyridines. By the term "4-carbonyl-substituted pyridines," as used herein, is to be understood pyridines which bear, as substituents in the 4-position, a formyl (H—CO—)

or an alkanoyl (R—CO—) radical, thus including isonicotinaldehyde and 4-pyridyl alkyl ketones.

Isonicotinaldehyde thiosemicarbazone is a known antitubercular compound. Because of the unavailability of isonicotinaldehyde and, because of its great instability and the consequent difficulty of preparing this aldehyde, it has heretofore been necessary, in order to prepare the thiosemicarbazone of isonicotinaldehyde, to use indirect methods. One such method comprises the reaction of isonicotinic acid hydrazide with benzenesulfonyl chloride to form 1-isonicotinyl-2-benzenesulfonylhydrazine. This latter product is thereafter reacted with thiosemicarbazide in the presence of an alkali to produce the thiosemicarbazone of isonicotinaldehyde. The yields obtained are reported to be of the order of 30% of the theoretical. This yield does not, however, include losses consequent to the production of the initial isonicotinic acid hydrazide from 4-picoline.

We discovered that isonicotinaldehyde thiosemicarbazone can be prepared, in yields (overall yields based on the 4-picoline used) higher than the foregoing, directly from gamma-picoline (4-methylpyridine) in a one-step reaction. In accordance with the general process of this invention, gamma (or 4)-picoline and other 4-alkyl-substituted pyridines are merely heated with sulfur and thiosemicarbazide or compounds which yield thiosemicarbazide under the prevailing reaction conditions. The reaction is normally conducted at temperatures between approximately 100° and approximately 200° C., and preferably between 130° and 180° C., and proceeds with the evolution of hydrogen sulfide. Although the mechanism of the reaction is not clearly understood, the result may be expressed by the following equation:

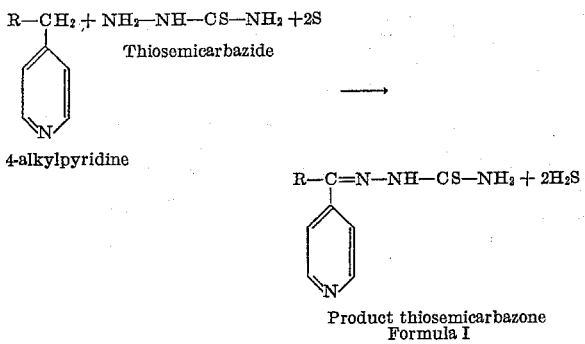

Product thiosemicarbazone
Formula I in which R is hydrogen or an alkyl radical. The heating is normally conducted for about two hours.

Besides 4-picoline, other 4-alkyl-substituted pyridines, particularly 4-ethyl and 4-n-propylpyridines, may be used to prepare corresponding thiosemicarbazones of 4-pyridyl alkyl ketones.

In place of thiosemicarbazide, salts of thiosemicarbazide with inorganic acids, such as the hydrochloride, or other thiosemicarbazide-engendering substances, may be used.

The reactions are generally conducted without the addition of another solvent or diluent and may, as indicated in Example 3 hereinafter, be conducted in the molten state. However, the pyridine derivatives themselves, or inert high-boiling hydrocarbons and chlorinated hydrocarbons, may be used to obtain desired reaction conditions.

Normally it is desirable to use stoichiometric equivalents of reactants, as shown in Examples 3 and 4 hereinafter. However, since the alkylpyridines are recoverable, they may be used in stoichiometric excess.

The products of the process and the unused reactants can be recovered in conventional manners.

Typical methods of practicing the process of our invention are illustrated in the examples which follow:

Example 1.—Preparation of isonicotinaldehyde thiosemicarbazone (Formula I in which R is H).

Ninety-three (93) grams (1.0 mole) of gamma-picoline and 96 grams (3.0 moles) of sulfur powder are heated in an oil bath with stirring to 150° C., whereupon the sulfur dissolves. To this solution is then added 91 grams (1.0 mole) of thiosemicarbazide and the temperature of the reaction mixture is maintained between 135 and 145° C. The reaction commences with a copious liberation of hydrogen sulfide and the mixture is maintained within the specified temperature range for approximately 2 hours. It is thereafter allowed to cool and the mixture is taken up in a dilute aqueous solution of sodium hydroxide. Small amounts of sulfur remain undissolved and are removed by filtration. The alkaline filtrate is then neutralized to a pH of approximately 7.0 with dilute aqueous hydrochloric acid, whereupon isonicotinaldehyde thiosemicarbazone precipitates in the form of light yellow crystals. When recrystallized from ethanol (large volumes are required) the product has a melting point of 224–226° C. with decomposition. A mixed melting point determination with an authentic sample prepared by another method showed no depression.

The yield of isonicotinaldehyde thiosemicarbazone thus obtained is approximately 30% of the theoretical. Although most of the thiosemicarbazide is used or destroyed during the reaction, the gamma-picoline that is not converted is recoverable and may be used in subsequent preparations.

In preparing larger batches, the thiosemicarbazide and gamma-picoline may be first heated together to a temperature of about 135° C. and the sulfur may then be added gradually in molten form to the heated mixture. A silicone oil or other antifoam agent may be added to control the vigorous foaming that may be produced by the hydrogen sulfide gas evolved.

Example 2.—Preparation of isonicotinaldehyde thiosemicarbazone

The reaction product of Example 1 can alternatively be recovered in the following manner:

After the 2-hour period of heating, the reaction mixture is cooled to 100° C. Two hundred (200) milliliters of cold water are added and the mixture is left to cool and crystallize overnight. The precipitate thus formed is separated by filtration, boiled with 200 milliliters of water, in order to dissolve out unreacted thiosemicarbazide, and filtered while hot. The remaining mixture of sulfur and isonicotinaldehyde thiosemicarbazone can be freed from sulfur by extraction with solvents such as carbon disulfide or by boiling with toluene.

A portion of the unreacted gamma-picoline and thiosemicarbazide can be recovered from the mother liquor during the first step of the recovery. Moreover, the mother liquor contains a small proportion of the oxidation product of isonicotinaldehyde thiosemicarbazone that is insoluble in aqueous sodium hydroxide solution and has a melting point of 244° C.

*Example 3.—Preparation of the thiosemicarbazone of 4-pyridyl methyl ketone (Formula I in which R is $CH_3$)*

A mixture of 214 grams (2 moles) of 4-ethylpyridine, 128 grams (4 moles) of sulfur powder and 182 grams (2 moles) of thiosemicarbazide is heated with stirring to a temperature of 130° C.

The resulting melt is held at this temperature for approximately 2½ hours until no further substantial amounts of hydrogen sulfide are evolved. The unreacted 4-ethylpyridine is recovered by distillation with steam and the crystallized residue is separated by filtration and taken up in 1000 milliliters of 2 N aqueous sodium hydroxide solution. After removal of the unreacted sulfur by filtration, the thiosemicarbazone of 4-pyridyl methyl ketone is precipitated from the alkaline solution by neutralization to a pH of approximately 7.0 with dilute hydrochloric acid. The resulting crude product is again redissolved in ice-cold aqueous 2 N sodium hydroxide solution and reprecipitated by addition of dilute hydrochloric acid and recrystallized from methanol. The yield of product is approximately 33% of the theoretical and its melting point is 229–231° C. with decomposition. A mixed melting point with the product obtained from 4-pyridyl methyl ketone and thiosemicarbazide showed no depression. The elemental analysis of the product was as follows:

|  | Found | Calculated for $C_8H_{10}N_4S$ |
|---|---|---|
|  | Percent | Percent |
| Carbon | 49.25 | 49.45 |
| Hydrogen | 5.15 | 5.16 |
| Nitrogen | 28.30 | 28.85 |
| Sulfur | 16.15 | 16.49 |

*Example 4.—Preparation of the thiosemicarbazone of 4-pyridyl ethyl ketone (Formula I in which R is $C_2H_5$)*

A mixture of 60.5 grams (0.5 mole) of 4-n-propylpyridine, 32 grams (1 mole) of sulfur and 45.5 grams (0.5 mole) of thiosemicarbazide was heated with stirring for approximately 2½ hours at a temperature between 140 and 145° C. in an oil bath. After substantially all the hydrogen sulfide had been evolved, 40 milliliters of methanol was added to the still warm solution, which was then filtered to remove a residue consisting of 16.5 grams composed principally of unconverted sulfur and thiosemicarbazide. From the filtrate, after standing overnight, the reaction product crystallizes together with an additional small portion of sulfur. The product is separated from the sulfur by dissolving it in 10% aqueous sodium hydroxide solution and, after filtration, neutralizing with dilute hydrochloric acid. A yield of 7.5 grams of 4-pyridyl ethyl ketone thiosemicarbazone, corresponding to approximately 7% of the theoretical yield based on the propylpyridine, was obtained in this manner. The melting point of the product, after recrystallization from methanol, is 197° C. with decomposition and its elemental analysis is as follows:

|  | Found | Calculated for $C_9H_{12}N_4S$ |
|---|---|---|
|  | Percent | Percent |
| Carbon | 52.20 | 51.90 |
| Hydrogen | 5.75 | 5.77 |
| Nitrogen | 25.87 | 26.98 |
| Sulfur | 15.45 | 15.38 |

A mixed melting point with a sample prepared from 4-n-pyridyl ethyl ketone and thiosemicarbazide showed no depression.

The unreacted 4-n-propylpyridine can be recovered from the original mother liquor by distillation with steam.

Inasmuch as the foregoing specification comprises preferred embodiments of the invention, it is to be understood that these were selected for purposes of illustration and that variations and modifications therein may be made without departing from the invention or the scope of the appended claims.

We claim:

1. A process for the production of a thiosemicarbazone of a 4-carbonyl-substituted pyridine which comprises heating together at a temperature between approximately 100° C. and approximately 200° C. a mixture of a 4-alkylpyridine, sulfur, and a substance of the group consisting of thiosemicarbazide and its salts with inorganic acids, and subsequently recovering the resulting thiosemicarbazone.

2. A process for the production of a thiosemicarbazone of a 4-carbonyl-substituted pyridine which comprises heating together at a temperature between 100° and 200° C. a 4-alkylpyridine with sulfur and thiosemicarbazide and subsequently recovering the resulting thiosemicarbazone.

3. A process as defined in claim 1 in which the heating is conducted at a temperature between approximately 130° and approximately 180° C.

4. A process as defined in claim 2 in which the stoichiometric proportions of the reactants are approximately 1 mole of 4-alkylpyridine, 2 moles of sulfur and 1 mole of thiosemicarbazide.

5. A process for the production of isonicotinaldehyde thiosemicarbazone which comprises heating together at a temperature between approximately 130° and approximately 180° C. a mixture of 4-picoline, sulfur and thiosemicarbazide in the approximate molecular proportions of 1:2:1, respectively, and recovering the resulting isonicotinaldehyde thiosemicarbazone.

6. A process for the production of the thiosemicarbazone of 4-pyridyl methyl ketone which comprises heating together at a temperature between approximately 130° and approximately 180° C. a mixture of 4-ethylpyridine, sulfur and thiosemicarbazide in the approximate molecular proportions of 1:2:1, respectively, and, after expulsion of substantially all the hydrogen sulfide formed in the reaction, recovering the resulting thiosemicarbazone of 4-pyridyl methyl ketone.

7. A process for the production of the thiosemicarbazone of 4-pyridyl ethyl ketone which comprises heating together at a temperature between approximately 130° and approximately 180° C. a mixture of 4-propylpyridine, sulfur and thiosemicarbazide in the approximate molecular proportions of 1:2:1, respectively, and, after expulsion of substantially all the hydrogen sulfide formed in the reaction, recovering the resulting thiosemicarbazone of 4-pyridyl ethyl ketone.

References Cited in the file of this patent

UNITED STATES PATENTS

| 2,495,567 | Carmack et al. | Jan. 24, 1950 |
| 2,496,319 | Thayer | Feb. 7, 1950 |
| 2,515,233 | Keller | July 18, 1950 |
| 2,676,178 | Fox | Apr. 20, 1954 |

FOREIGN PATENTS

| 689,877 | Great Britain | Apr. 8, 1953 |